United States Patent [19]
Abe et al.

[11] Patent Number: 6,070,882
[45] Date of Patent: Jun. 6, 2000

[54] SEALING STRUCTURE

[75] Inventors: Yoshitaka Abe; Hironobu Imanaka; Takeshi Naito; Yoshinori Iwamoto; Takashi Suzuki, all of Toyonaka, Japan

[73] Assignee: Kokusan Parts Industry Co., Ltd., Osaka, Japan

[21] Appl. No.: 08/972,247

[22] Filed: Nov. 18, 1997

[30] Foreign Application Priority Data

Nov. 18, 1996 [JP] Japan ..................................... 8-306245

[51] Int. Cl.⁷ ..................................................... F02F 11/00
[52] U.S. Cl. ........................... 277/592; 277/594; 277/596
[58] Field of Search .................................. 277/591, 592, 277/594, 596, 652

[56] References Cited

U.S. PATENT DOCUMENTS 5,075,174  12/1991  Pyle ..................................... 277/652 X
5,385,354  1/1995  Hagiwara et al. ....................... 277/594
5,582,415  12/1996  Yoshida et al. ......................... 277/592
5,615,898  4/1997  Clark et al. ............................. 277/596
5,692,758  12/1997  Wilkstrom ............................... 277/591
5,695,198  12/1997  Iwamoto et al. ........................ 277/402

*Primary Examiner*—Anthony Knight
*Assistant Examiner*—Alison K. Pickard
*Attorney, Agent, or Firm*—Armstrong, Westerman, Hattori, McLeland & Naughton

[57] ABSTRACT

A seal structure and capable of reducing a width of a seal portion as much as possible while preventing the seal portion from being broken away. The seal structure for sealing between two members in a fluid-tight or air-tight manner is structured such that the seal portion is formed in at least one of joint surfaces of the two members by continuously printing along a seal portion of the joint portions and that a recess portion or a groove is formed at a middle portion of the seal portion in a widthwise direction.

10 Claims, 10 Drawing Sheets

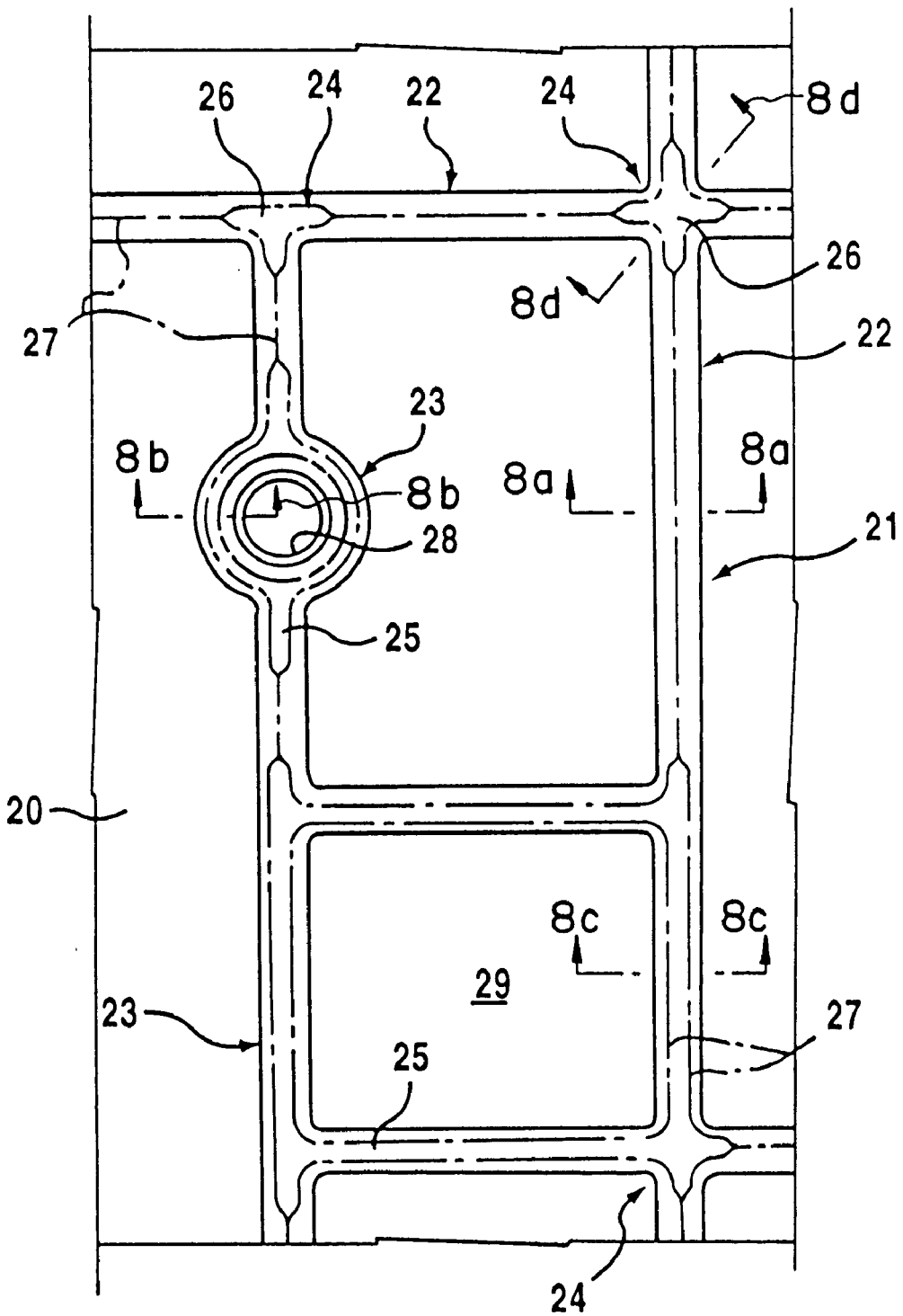

Fig.11
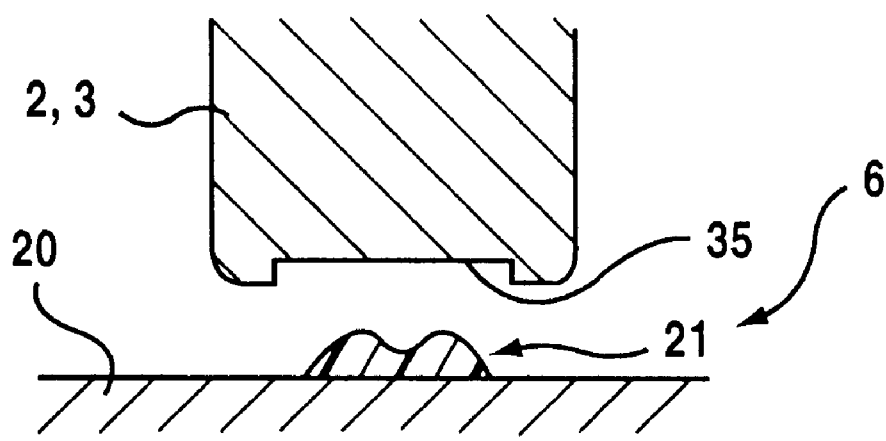
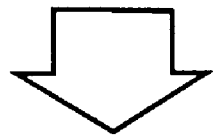
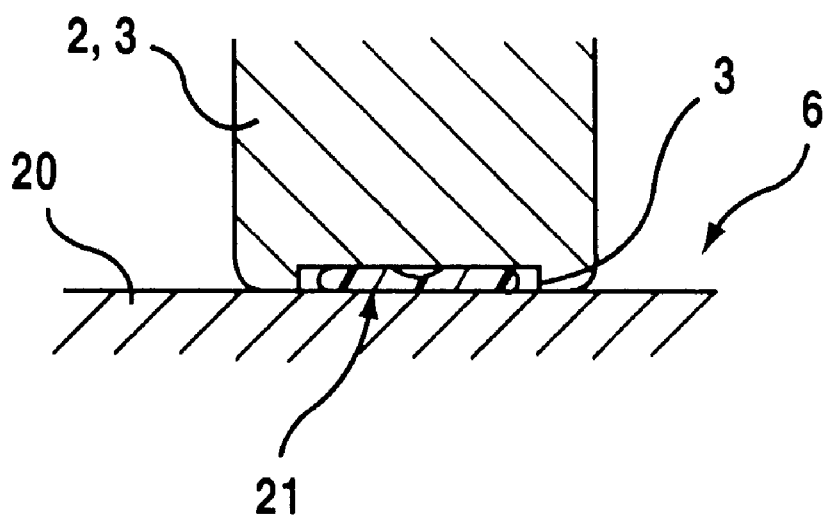

Fig.12
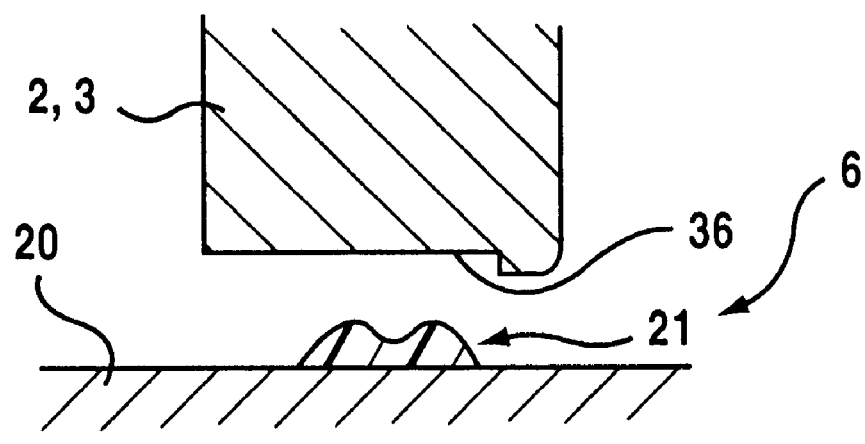
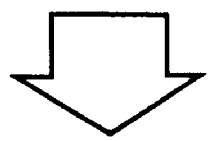
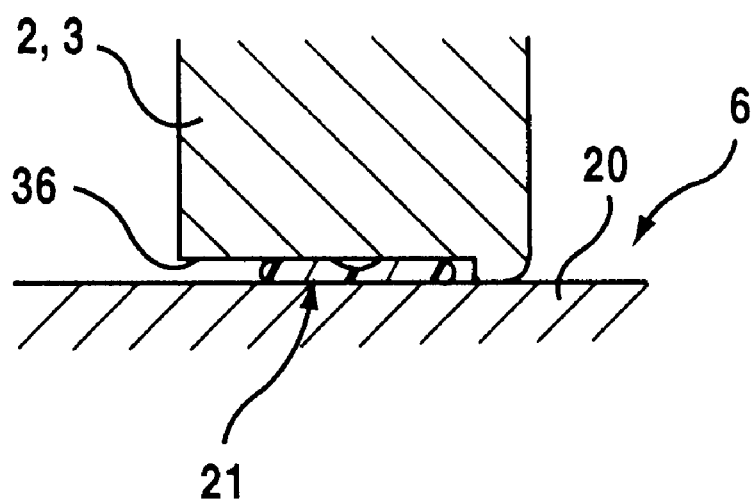

SEALING STRUCTURE

BACKGROUND OF THE INVENTION

1. Field of the Invention

The present invention relates to a seal structure for sealing two members in a fluid-tight or an air-tight manner by a seal portion formed by printing.

2. Prior Art

Generally, a seal structure for sealing two members by holding a gasket made of a synthetic rubber, metal, or paper between the two members has been employed as a seal structure for sealing between two members in a fluid-tight or air-tight manner.

However, when the above type of seal structure is employed to, for example, a control valve unit of an automatic transmission for an automotive vehicle, a plurality of gaskets are necessary so that the operability of assembling the unit is deteriorated. Further, it is necessary to form a multiplicity of through holes on the gasket in correspondence to an oil passage, so that there are problems in that a cost for manufacturing the gasket is increased and that the design of unit cannot be easily changed.

Then, a seal structure manufactured in a low cost and having an excellent operability of assembling has been suggested by printing a synthetic rubber material to one of joint surfaces between two members along a seal portion by a screen printing so as to integrally form the seal portion.

In this kind of seal structure, basically when the width of the seal portion is increased, the height of the seal portion is slightly increased due to the fact that a surface tension of the material and a contact area against the joint surface becomes large so as to reduce a surface pressure, thereby being difficult to compress, and when the width of the seal portion is decreased, the height of the seal portion is slightly reduced due to the fact that a surface tension of the material and a contact area against the joint surface becomes small so as to increase a surface pressure, thereby being easy compress.

Accordingly, in order to improve a total sealing performance, it is preferable to reduce the width of the sealing portion. However, when the width is reduced much, the contact area of the seal portion becomes small and a problem of break away is generated. Therefore, the seal portion is normally narrowed to a degree such that the break away is not generated, thereby securing a proper sealing performance.

On the other hand, in order to improve a sealing performance locally, it is structured that the width of the seal portion is increased and the height of the seal portion is increased, thereby increasing a sealing performance. Further, at a portion in which a surface pressure is increased near a fastened portion by a bolt, it is structured that the width of the seal portion is reduced so as to reduce the height of the seal portion and a compression deformation is easily occurred, so that the other sealing portion is prevented from deteriorating a sealing performance.

In the above seal structure, since the width of the seal portion is increased at a meeting portion in which a plurality of seal portions are crossed together so as to increase the height of the seal portion, there is a problem that a sealing performance near the meeting portion is deteriorated.

Further, although it is possible to locally improve the seal performance by increasing the width of the seal portion in the above manner, often this structure cannot be applied to an apparatus such as a control valve which is greatly limited in the width of the seal portion.

Still further, in the case that the width of the seal portion is reduced and the compression deformation is easily performed so as to prevent a local surface pressure near the fastened portion by a bolt, since it is necessary to relatively reduce the width of the seal portion in the local portion by increasing the width of the seal portion of the other portion so as to solve the break away of the seal portion, the structure cannot be often applied to the apparatus such as a control valve in the same manner as to the above.

Furthermore, in the case of locally adjusting the width of the seal portion in the above manner, since the seal height of the local portion becomes high and the sealing performance near the portion is changed, in the event, a total design change is necessary so that the design and the design change of the seal portion become complicated.

SUMMARY OF THE INVENTION

An object of the present invention is to provide a seal structure having a simple structure, easily designed, capable of changing a sealing performance in a necessary portion and capable of reducing a width of a seal portion as much as possible.

In accordance with an invention as recited in claim 1, there is provided a seal structure for sealing between two members in a fluid-tight or air-tight manner, wherein a seal portion is formed in at least one of joint surfaces of the two members by continuously printing along a seal portion of the joint portions and wherein a recess portion or groove is formed at a middle portion of the seal portion in a widthwise direction.

In this structure, there are preferable embodiments such that the recess portion or the groove is formed in such a manner that a height printed in the seal portion is not locally changed which is described in claim 2, that the recess portion or the groove is formed at a meeting portion in which a plurality of seal portions are crossed to each other which is described in claim 3, that the recess portion or the groove is formed at a portion in which a height printed in the seal portion is desired to be locally reduced which is described in claim 4, that the recess portion or the groove is formed at a seal portion near a fastening portion by a bolt which is described in claim 5, that the recess portion or the groove is formed at a portion in which a sealing performance is desired to be locally improved which is described in claim 6, and that the width of the recess portion or the groove is gradually or continuously changed which is described in claim 7.

Further, there are preferable embodiments such that the seal portion is made of a hard material and a hardness of the material is set to 10 to 50 in the hardness of type D durometer which is defined by JIS K 6253 which is described in claim 8, that the seal portion is formed by successively printing a plurality of materials having a different composition which is described in claim 9, that the seal portion is formed at one of the joint surfaces of the two members and a seal groove which is closely attached to the seal portion by fitting thereto from the outer portion thereof is formed in correspondence to the seal portion which is described in claim 10, and that one of the two members is a separate plate of a control valve unit for an automotive vehicle and the other of the members is a valve body separated in an oil-tight manner by the separate plate which is described in claim 11.

In accordance with the seal structure as recited in claim 1, since the seal portion is formed in at least one of the joint surfaces of the two members by printing along the seal portion of the joint surfaces and the two members are bonded by joining the two members, the joint surfaces of the members can be sealed through the seal portion.

Further, since the recess portion or the groove is formed at the middle portion of the seal portion in the width direction, a contact area of the seal portion with respect to the other joint surface becomes small without reducing the width of the seal portion, that is, without reducing the contact area of the seal portion with respect to the one joint surface. Accordingly, the seal portion can be easily compressed and deformed and the height of the seal portion is slightly reduced due to a surface tension of the material.

As mentioned above, since the contact area of the seal portion with respect to the other joint surface becomes small, the seal portion is prevented from being closely bonded to the other joint surface, so that the seal portion can be easily broken away from the other joint surface at a time of performing a maintenance or replacing a part so as to resolve both the members.

Further, in accordance with the seal structure as recited in claim 3, since the recess portion or the groove is formed at the meeting portion in which the plurality of seal portions are crossed to each other, the height of the seal portion at the meeting portion can be reduced and be set to substantially the same as that of the other portions and the compression and deformation at the meeting portion can be promoted. Accordingly, deterioration of the sealing performance at the seal portion near the meeting portion can be prevented.

Still further, in accordance with the seal structure as recited in claim 4 or claim 5, since the recess portion of the groove is formed at a portion in which the height printed in the seal portion is desired to be locally reduced, for example, the seal portion near a fastening portion by a bolt, the compression and deformation of the seal portion is promoted. Accordingly, relative deterioration of the sealing performance at the portion other than the fastened portion by the bolt can be prevented without reducing the seal width, that is, with preventing the break away of the seal portion.

Furthermore, in accordance with the seal structure as recited in claim 6, since the recess portion or the groove is formed at the portion in which a sealing performance is desired to be locally improved, the local portion can be effectively sealed by a plurality of seal line with hardly increasing the width of the seal portion, and the height of the seal portion in the local portion can be set to the same as that of the seal portion in the other portions. Accordingly, the structure does not give a bad influence to the sealing performance with respect to the other portions.

In the above seal portion it is preferable that the recess portion or the groove is basically formed such that the print height of the seal portion is not locally changed in such a manner as to be recited in claim 2. Accordingly, when the height is locally changed, the sealing performance of the local portion can be changed, but the sealing performance in the portion other than the local portion is relatively changed. Therefore, it is preferable to make a height of a top portion not change locally, taking easiness of the design and design change into consideration. Further, in order to realize this, the groove is formed all around the seal portion or the width of the recess portion or the groove is gradually or continuously changed as described in claim 7.

In accordance with the seal structure as recited in claim 8, since the seal portion is made of a hard material and a hardness of the material is set to 10 to 50 in the hardness of type D durometer which is defined by JIS K 6253, an abnormal deformation of the seal portion at a time of fastening by the bolt can be prevented, so that the seal portion can be prevented from being broken away from an edge portion thereof.

In accordance with the seal structure as recited in claim 9, since the seal portion is formed by successively printing the plurality of materials having a different composition, the surface pressure is adjusted by, for example, successively laminating a soft member and a hard member or the material of the seal portion at the portion in contact with the fluid is changed in accordance with the fluid within the area to be sealed, so that deterioration in the seal portion can be prevented.

In accordance with the seal structure as recited in claim 10, since the seal portion is formed at one of the joint surfaces of the two members and the seal groove which is closely attached to the seal portion by fitting thereto from the outer portion thereof is formed in correspondence to the seal portion, a gap corresponding to the depth of the seal groove is formed near the seal portion. Accordingly, the abnormal deformation in the seal portion can be securely prevented.

In accordance with the seal structure as recited in claim 11, since one of the two members is the separate plate of the control valve unit for an automotive vehicle and the other of the members is the valve body separated by the separate plate, the both elements can be sealed in an oil-tight manner by combining the separate plate and the valve body in the joint surface. Further, since the seal portion is formed by printing, it is possible to easily form the seal portion in correspondence to a complex pattern of the joint surface of the valve body.

BRIEF DESCRIPTION OF THE DRAWINGS

FIG. 7 is a plan view of a main part of the separate plate;

FIGS. 8A to 8D are vertical cross sectional views of FIG. 7, in which FIG. 8A is a cross sectional view along a line a—a, FIG. 8B is a cross sectional view along a line b—b, FIG. 8C is a cross sectional view along a line c—c and FIG. 8D is a cross sectional view along a line d—d;

FIG. 11 is a horizontal cross sectional view of a seal structure in accordance with the other embodiment;

FIG. 12 is a horizontal cross sectional view of a seal structure in accordance with the other embodiment.

DETAILED DESCRIPTION OF THE PREFERRED EMBODIMENT

An embodiment in accordance with the present invention will be explained below with reference to the accompanying drawings.

This embodiment shows the case in which the invention is applied to a seal structure of a control valve unit in an automatic transmission of an automotive vehicle.

Figure 1:
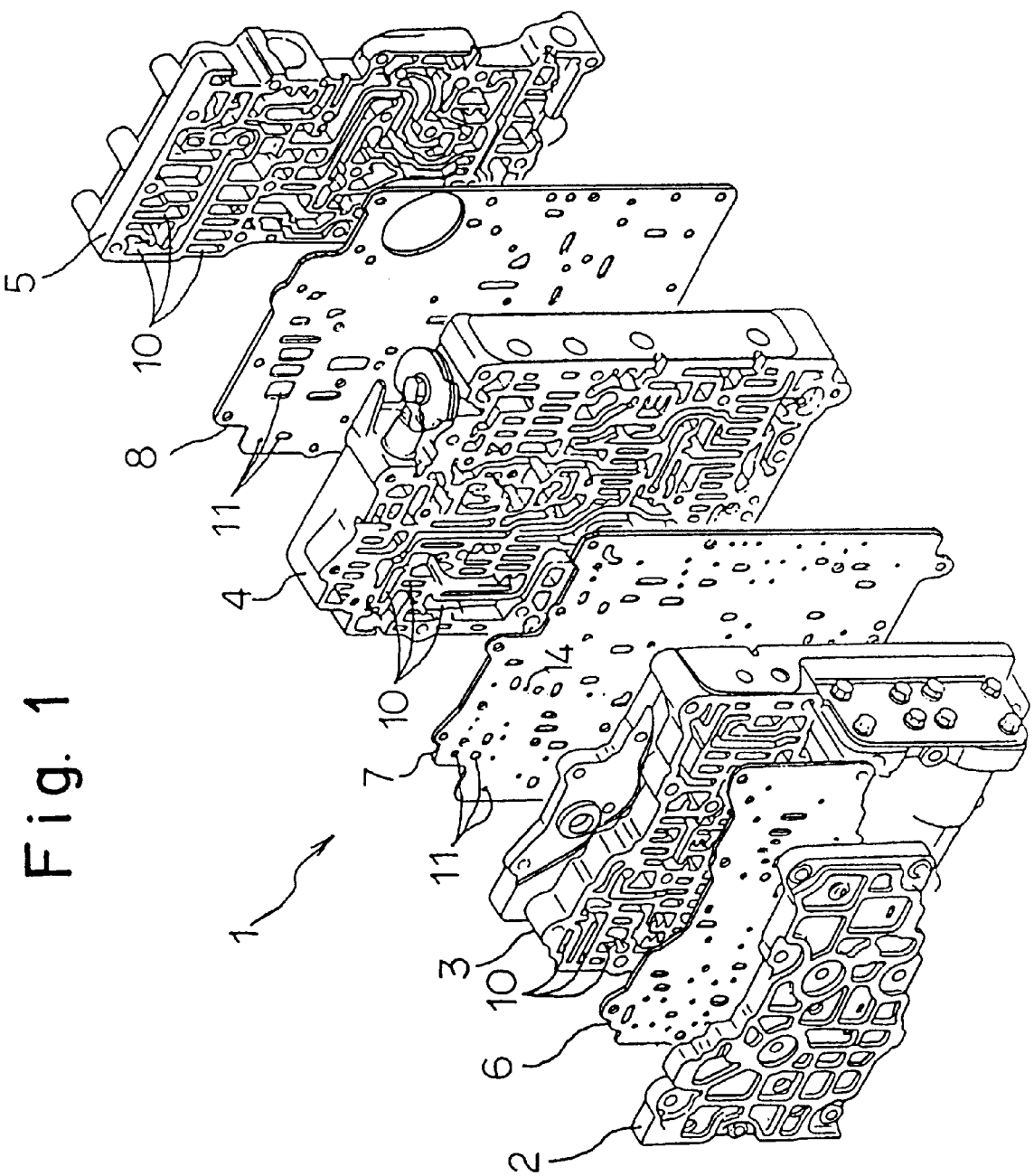
FIG. 1 is an exploded perspective view of a control valve unit.
Figure 2:
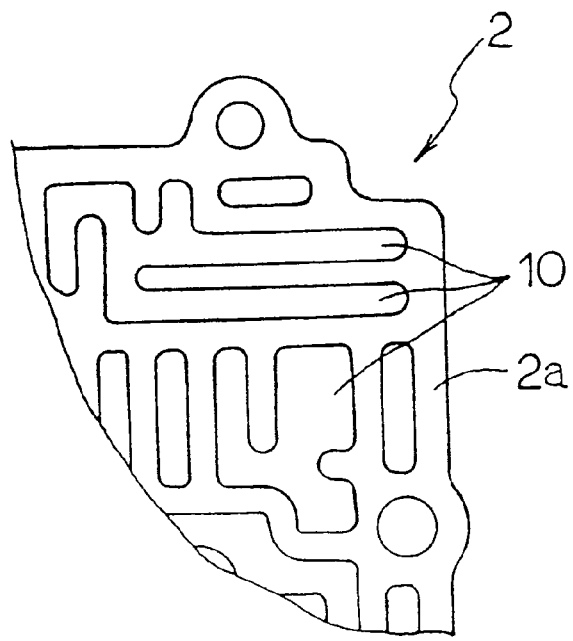
FIG. 2 is a view which shows an end surface of a main part of a front valve body close to a separate plate.

As shown in FIG. 1, a control valve unit 1 is separately constituted by four valve bodies consisting of a front valve body 2, a pre-main valve body 3, a main valve body 4 and a rear valve body 5. Separate plates 6, 7 and 8 are respectively mounted between the valve bodies 2 and 3, between the valve bodies 3 and 4, and valve bodies 4 and 5.

An oil groove 10 is formed on one side surface of the valve bodies 2 and 5, and both side surfaces of the valve bodies 3 and 4 in a predetermined pattern, and the separate plates 6 to 8 are respectively mounted to joint surfaces of the valve bodies 2 to 5 in an oil-tight manner. Accordingly, an oil pressure circuit is formed between the separate plates 6 to 8 and the valve bodies 2 to 5. A plurality of oil holes 11 which communicate adjacent oil grooves 10 of the valve bodies 2 to 5 are formed in the separate plates 6 to 8 at a predetermined arrangement. In this case, since the oil pressure circuit itself of the control valve unit 1 is not directly related to the invention, the detailed description thereof is omitted. Further, in FIG. 1, an illustration of a seal portion 21 which is mentioned below is omitted.

Next, a seal structure for sealing between the valve bodies 2 to 5 and the separate plates 6 to 8 in an oil-tight manner will be described below with reference to FIGS. 2 to 9. In this case, since the respective seal structures between the separate plates 6 to 8 and the valve bodies 2 to 5 basically have the same construction, the seal structure between the front valve body 2 and the pre-main valve body 3, and the separate plate 6 will be described below.

The separate plate 6 is provided with a flat plate like base plate 20 and the seal portion 21 formed on both side surface thereof by printing.

It is possible to use a plate member made of a metal such as a stainless steel or an aluminum alloy, or a nonmetal such as a synthetic resin for the base plate 20, however, considering that the structure is used in an oil pressure circuit which does not need an anticorrosive property, it is preferable to use a steel plate which has a sufficient strength and rigidity and can be manufactured with a low cost.

Figure 3:
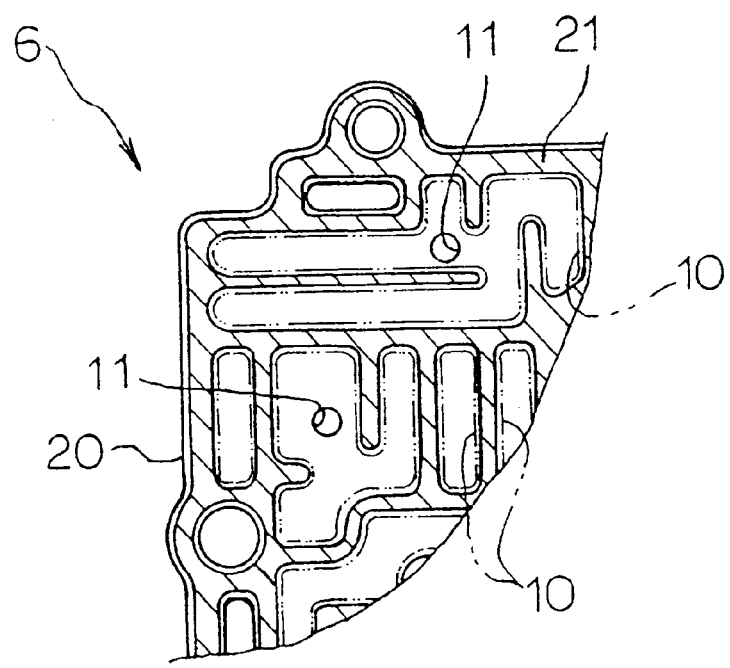
FIG. 3 is a view which explains a seal portion formed on a surface of the separate plate close to the front valve body.
Figure 4:
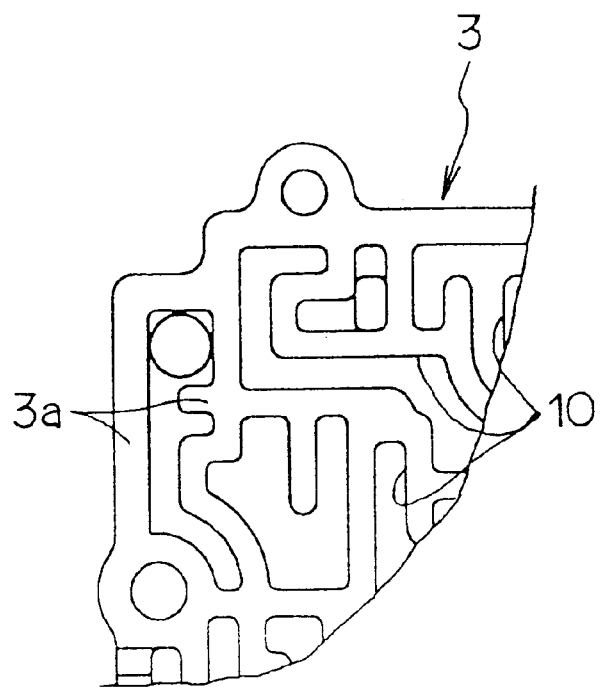
FIG. 4 is a view which shows an end surface of a main part of a pre-main valve body close to the separate plate.
Figure 5:
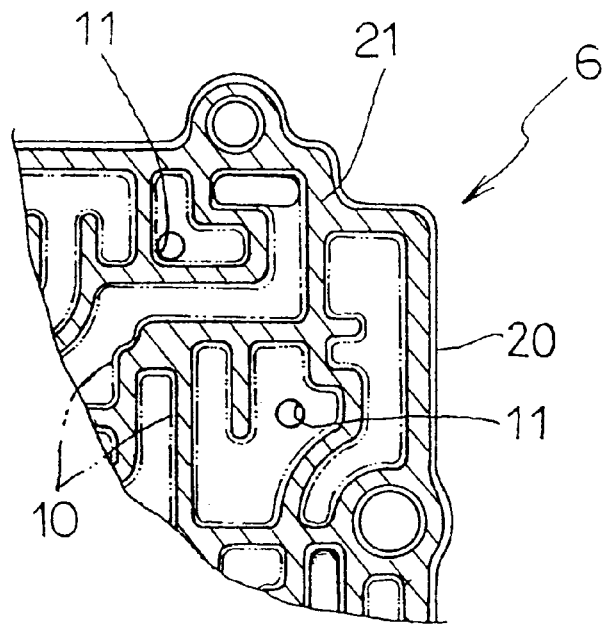
FIG. 5 is a view which explains a seal portion formed on a surface of the separate plate close to the pre-main valve body.
Figure 6:
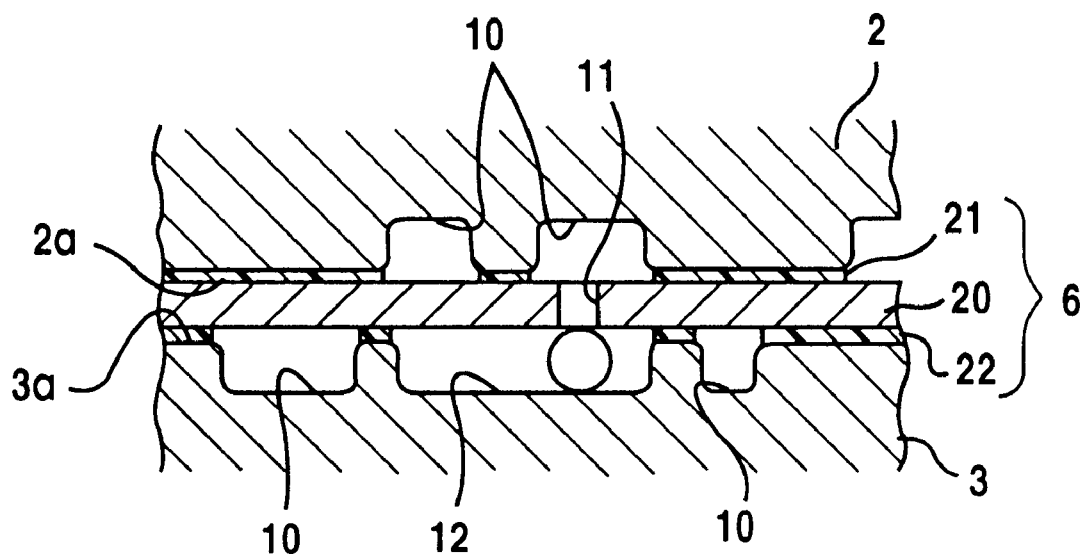
FIG. 6 is a horizontal cross sectional view of a main part of the control valve unit.

The seal portion 21 is formed along joint surfaces 2a and 3a of the valve bodies 2 and 3, as shown in a hatching line in FIGS. 3 and 5, and is arranged in an inner side of portions corresponding to the joint surfaces 2a and 3a in such a manner that a side edge of the seal portion 21 is not exposed from the oil groove 10 in a state that the separate plate 6 is mounted between the valve bodies 2 and 3.

The seal portion 21 basically comprises, as shown in FIGS. 7 and 8, a one-mountain portion 22 having a cross sectional shape of a mountain and having a top portion which continuously extends along the seal portion, a two-mountain portion 23 having a cross sectional shape of a mountain with a common bottom portion, provided with a groove 25 formed in a central portion in a widthwise direction and having two top portions which respectively extend continuously along the seal portion with the same height, and a meeting portion 24 having a cross sectional shape of a mountain with a common bottom portion, in which a plurality of one-mountain portions 22 and two-mountain portions 23 are crossed to each other, having a recess portion 26 formed in a central portion thereof, and two top portions which continuously extend with the same height. In this case, it is possible to form a plurality of grooves in a middle portion of the seal portion 21 in the width direction so as to form a seal portion having a cross sectional shape of a mountain comprising three or more mountains. Reference numeral 27 denotes an imaginary seal line formed by the top portion of the seal portion 21.

Figure 8A:
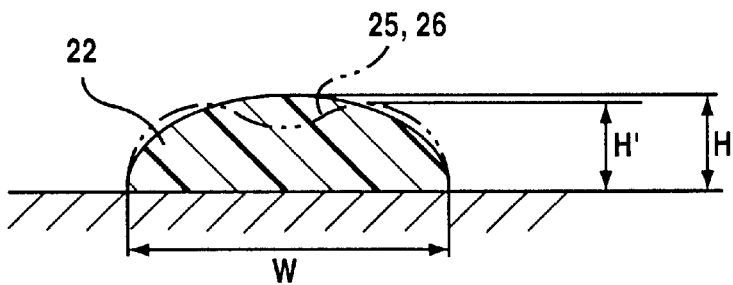

As mentioned above, when the groove 25 or the recess portion 26 is formed, as shown in FIG. 8A, in a state that the seal width is set to the same value as a width W of the one-mountain portion 22, a height H' of the top portion becomes slightly lower than a height H of the one-mountain portion 22, and the contact area with respect to the joint surface is reduced, thereby increasing a surface pressure to be operated, so that compression and deformation are easily performed.

Accordingly, the two-mountain portion 23 is basically formed in a portion in which the surface pressure becomes higher than a desired value and a portion in which a sealing performance is highly desired, so that, for example, as shown in FIG. 7, the two mountain portion is formed in such a manner as to surround a through hole 28 for mounting by a bolt, in which the surface pressure becomes high, or to surround an area 29 in which an oil pressure becomes high. However, the two-mountain portion can be applied to the other portions, and can be formed all around the seal portion 21 so that the sealing performance can be totally improved.

Figure 8B:
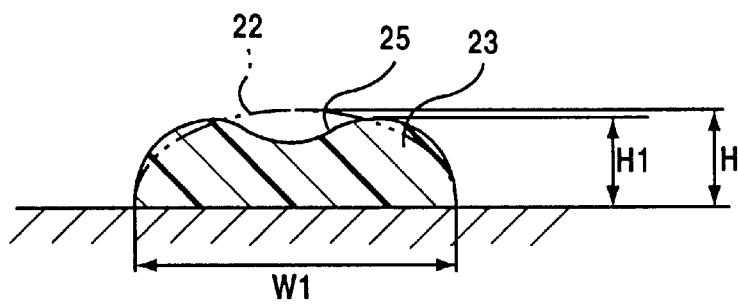

In the two-mountain portion 23 provided so as to surround the through hole 28, as shown in FIG. 8B, it is preferable to set a width W1 of the two-mountain portion 23 to substantially the same as or slightly smaller than the width W of the one-mountain portion 22. In accordance with this structure, the height H1 of the two-mountain portion 23 becomes slightly smaller than the height H of the one-mountain portion 22 and the compression and deformation can be easily performed, so that the sealing performance in the bolt fastening portion can be sufficiently secured and deterioration of the sealing performance in the portion other than the bolt fastening portion can be prevented. Further, since it is not necessary to significantly reduce the width W1 of the two-mountain portion 23, a break away of the two-mountain portion 23 can be prevented. Since a local change of the height of the seal portion gives an influence to the sealing performance in the portion other than the local portion, taking easiness of design into consideration, the width W1 of the two-mountain portion 23 is set to a value slightly wider than the width of the one-mountain portion 22, as shown in FIG. 8C so that the height H1 of the two-mountain portion 23 and the height H of the one-mountain portion 22 are set to substantial the same relative to each other.

Figure 8C:
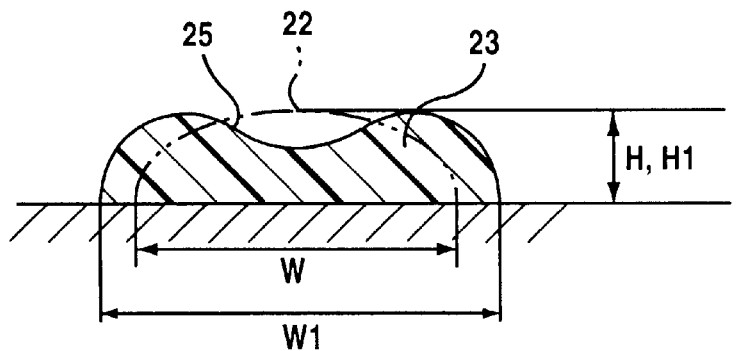

Further, in the two-mountain portion 23 provided in such a manner as to surround the area 29, the width W1 of the two-mountain portion 23 is set to a value slightly wider than the width of the one-mountain portion 22, as shown in FIG. 8C so that the height H1 of the two-mountain portion 23 is the same as the height H of the one-mountain portion 22, thereby effectively sealing the area 29 by the two seal line 27 formed by the top portion. In this case, it is possible to set the width W1 wider and to set the height H1 of the two-mountain portion 23 to a slightly higher value than the height H of the one-mountain portion 22, thereby improving the sealing performance.

Figure 8D:
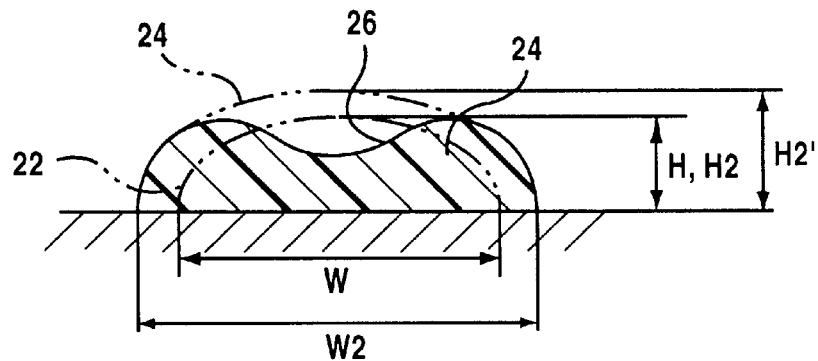

In a conventional meeting portion 24' in which a plurality of seal portion meet to each other, as shown in an imaginary line of FIG. 8D, a width W2 thereof becomes larger than the width W of the one-mounting portion 22 and a height H2' of a top portion thereof becomes larger than the height H of the top portion of the one-mountain portion 22. Accordingly, when the recess portion 26 is provided in such a manner as to be the meeting portion 24 shown in a solid line, a height H2 of the meeting portion 24 can be set to the same value as the height H of the one-mountain portion 22, and the compression and deformation is promoted, so that the surface pressure in the meeting portion 24 can be suitably set.

Figure 9:
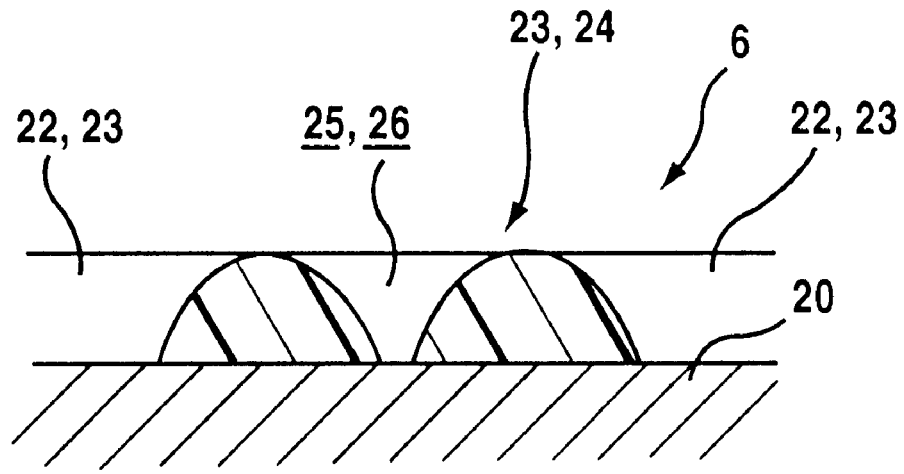
FIG. 9 is a horizontal cross sectional view of a seal structure in accordance with the other embodiment.

In this case, the groove 25 and the recess portion 26 are integrally formed at a time of forming the seal portion 21 by printing. Further, as shown in FIG. 9, the groove 25 and the recess portion 26 in the two-mountain portion 23 and the meeting portion 24 can be formed in such a manner as to extend to the surface of the separate plate 6. Further, since the groove 25 becomes to have the same cross sectional shape as that of the one-mountain portion 22 as the width of the groove 25 is narrowed, the sealing performance can be changed by gradually or continuously adjusting the width of the groove 25.

It is preferable to use a hard material having 10 to 50 in a hardness of type D durometer which is defined by JIS K 6253 for the material constituting the seal portion 21. Concretely speaking, a synthetic rubber material such as fluorine-contained rubber, butadiene-acrylonitrile rubber, butadiene-stylene rubber and silicon rubber, a synthetic resin material such as epoxy resin, silicon resin, phenol resin, urethane resin, polyimide resin, vinyl chloride resin, acrylic resin, polyurethane resin, ABS resin and PTFE (tetrafluoroethylene) resin, a synthetic resin material of the type being hardened by ultra violet, and a complex material which is made by mixing a metal power of aluminum alloy, copper, brass and stainless, or a glass powder or a glass fiber, or a ceramic powder or a ceramic fiber, or a molybdenum disulfide with the above synthetic rubber material or the synthetic resin material can be used.

A printing technology such as a letterpress printing, a lithography printing, an intaglio printing, a screen printing, a flocked printing, a magnetic printing and a roll leaf hot stamping, and a material applying technology by a dispenser can be employed for a printing technology for forming the seal portion 21. Further, the seal portion 21 may be formed by repeatedly printing the same material or by repeating the materials having a different characteristic.

Further, the seal portion 21 is formed by printing the base plate 20 to which a decreasing treatment is performed, however, in order to improve a tightness with respect to the base plate 20, before applying a decreasing treatment, a blast treatment or a chemical treatment may be applied to the base plate 20 so as to form uneven portions on the surface thereof. Still further, in order to improve a tightness of the seal portion 21 with respect to the base plate 20, the seal portion 21 may be printed with respect to the base plate 20 having both surfaces to which a primer is applied.

Next, an operation of the seal structure will be described below.

The seal portion 21 is formed on the separate plates 7 and 8 in the same manner as that of the separate plate 6, and the control valve unit 1 is assembled by fastening four valve bodies 2 to 5 which are respectively mounted to the separate plates 6 to 8 by bolts (not shown). Since the seal portion 21 is integrally formed with the separate plates 6 to 8 in the above manner, assembling operation of the control valve unit 1 can be greatly simplified.

Since the seal portion 21 is formed by printing, a complex pattern can be easily formed. Accordingly, the seal portion 21 can be set in such a manner as not to be exposed within the oil groove 10, so that a contact area between the seal portion 21 and the operation oil can be reduced as much as possible, thereby preventing the seal portion 21 from being deteriorated.

Further, when the two-mountain portion 23 is formed at a portion in which the surface pressure becomes higher than the degree to be desired, the compression and deformation is promoted so that the deterioration of the sealing performance in the portion other than the above portion can be prevented. When two-mountain portion 23 is formed at a portion in which improvement of the sealing performance is desired, the portion can be effectively sealed by two seal lines 27. When the recess portion 26 is provided in the meeting portion 24, the surface pressure in the meeting portion 24 can be suitably set.

Still further, the seal portion 21 having a different pattern can be formed on the surface of the base plate 20 by a simple operation, that is, replacing a negative plate for printing, thereby easily coping with a design change of the control valve unit 1.

Next, the other embodiment in which a structure of the seal portion 21 and the seal structure are partly changed will be described below.

Figure 10:
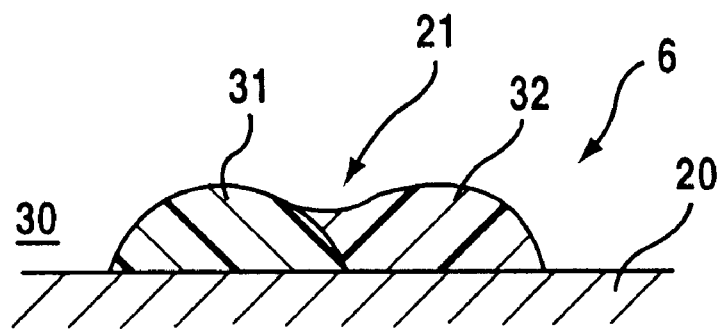
FIG. 10 is a horizontal cross sectional view of a seal structure in accordance with the other embodiment.

(1) In the case of sealing in such a manner as to surround by the independent seal line 27 as in the area 29, as shown in FIG. 10, seal layers 31 and 32 made of a different material can be used by printing with piling up a part thereof in a width direction for the seal portion 21. In this case, the seal layers 31 and 32 close to the portion which is in contact with the fluid can be respectively set in correspondence to the characteristic of the fluid at a time of sealing two fluids having a different characteristic such as an oil and a water, so that the sealing performance can be improved and the seal portion 21 can be prevented from being deteriorated. Further, when the seal layer made of a soft material and the seal layer made of a hard material are partially overlapped in the width direction, so as to set the height of the seal layer made of the soft material higher, the seal layer made of the hard material serves as a stopper, thereby preventing the seal layer made of the soft material from being crushed and being broken away.

(2) The seal structure may be provided with a seal groove 35 in the valve bodies 2 and 3 and with the seal portion 21 so as to fit into the seal groove 35, as shown in FIG. 11. In this case, since the seal portion 21 is not deformed more than a depth of the seal groove 35, an abnormal deformation of the seal portion 21 can be securely prevented. In this case, in place of the seal groove 35, a seal groove 36 as shown in FIG. 12 may be formed.

Figure 13:
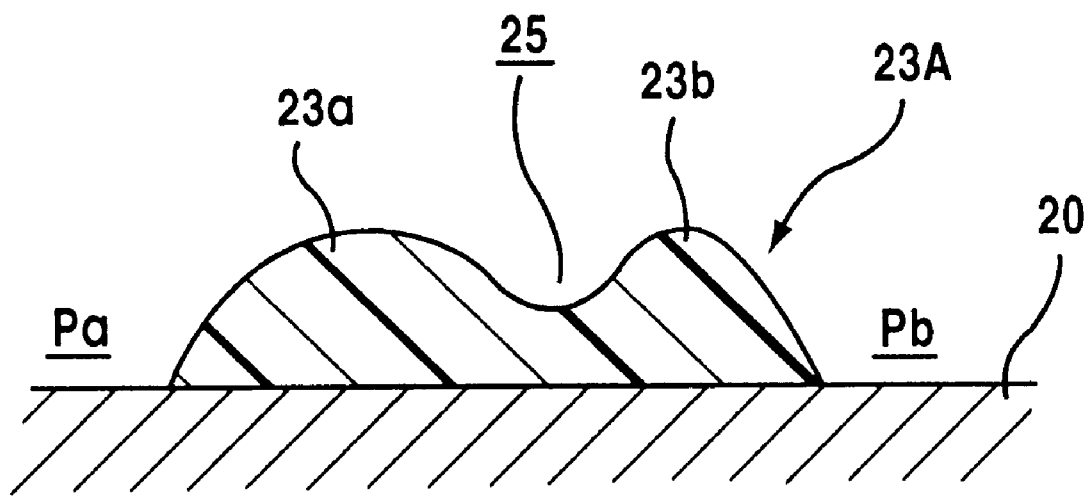
FIG. 13 is a horizontal cross sectional view of a seal structure in accordance with the other embodiment.

(3) The groove 25 is not always formed at a central portion in the width direction as far as the portion is on the middle way of the two-mountain portion 23 in the width direction. Accordingly, the groove 25 may be formed at a portion shifting toward one side from the central portion in the width direction as a two-mountain portion 23A shown in FIG. 13. For example, as shown in FIG. 13, in the case of sealing a fluid Pa having a high pressure and a fluid Pb having a low pressure in the two-mountain portion 23A, a mountain 23a having a greater width is formed at the high pressure fluid Pa end and a mountain 23b having a smaller width is formed at the low pressure fluid Pb end. Accordingly, the high pressure fluid Pa can be effectively sealed by the wider mountain 23a without enlarging the total width of the two-mountain portion 23A.

Further, in this embodiment, the invention is applied to the control valve unit 1 in the automatic transmission, however, the invention can be similarly applied as a seal structure for sealing an apparatus using an oil pressure and an air pressure other than the control valve unit 1.

In accordance with the seal structure of the invention, two members can be sealed without separately providing a gasket, so that assembling operability of two members can be improved and a manufacturing cost for the seal structure can be greatly reduced. Further, the width of the seal portion can be sufficiently secured by a simple structure that the recess portion or the groove is formed at the middle portion of the seal portion in the width direction, thereby preventing the seal portion from being broken away. The seal portion is reduced in the height thereof and is structured in such a manner as to be easily deformed, so that it is possible to prevent the surface pressure from being locally increased and to locally improve the sealing performance with keeping the height of the seal portion the same value. Accordingly, the sealing performance can be greatly improved and the designing and the design change can be easily performed. With respect to the design change, the seal portion can be delicately changed in correspondence to a tendency of a working accuracy in each of the parts of the joint surface in the other member. For example, a pattern of the seal portion is delicately changed in correspondence to a tendency of a working accuracy in every processing lines, so that a seal structure having an excellent quality in the sealing performance can be provided. Further, since the seal portion is provided by printing, even a seal portion having a complex pattern can be easily formed. Still further, since the portion in the portion in which the recess portion or the groove is formed has a smaller contact area with respect to the other joint surface, the seal portion is prevented from being stuck to the other joint portion, so that both the members can be easily removed at a time of maintenance and replacing a part.

When the recess portion or the groove is formed in such a manner that the height printed in the seal portion is not locally changed as recited in claim 2, a design or a design change of the seal portion can be easily performed.

When the recess portion or the groove is formed at the meeting portion in which the plurality of seal portions are crossed to each other as recited in claim 3, deterioration of the sealing performance at the seal portion near the meeting portion can be prevented.

When the recess portion of the groove is formed at a portion in which the height printed in the seal portion is desired to be locally reduced, for example, the seal portion near a fastening portion by a bolt as recited in claim 4 or claim 5, deterioration of the sealing performance at the portion other than the fastened portion by the bolt can be prevented with preventing the break away of the seal portion.

When the recess portion or the groove is formed at the portion in which a sealing performance is desired to be locally improved as recited in claim 6, the sealing performance of the local portion can be improved with preventing a bad influence to the sealing performance with respect to the portions other than the local portion.

When the width of the recess portion or the groove is gradually or continuously changed as recited in claim 7, local deterioration of the sealing performance can be prevented.

When the seal portion is structured in such a manner as to be recited in claim 8, deterioration of the sealing performance can be prevented with securely preventing the seal portion from being crushed and being broken away.

When the seal portion is structured in such a manner as to be recited in claim 9, the sealing performance can be further improved by, for example, successively printing a soft member and a hard member in a laminating manner and the deterioration in the seal portion can be prevented by changing the material of the seal portion at the portion in contact with the fluid in accordance with the fluid within the area to be sealed.

When the seal portion is structured in such a manner as to be recited in claim 10, the abnormal deformation in the seal portion can be securely prevented since the maximum deformation amount is determined by the depth or the width of the seal groove.

When the seal portion is structured in such a manner as to be recited in claim 11, a number of the parts of the control valve unit can be reduced so that the manufacturing cost is reduced, the assembling operability can be improved and the design change can be easily performed.

What is claimed is:

1. A seal structure for sealing between two members in a fluid-tight or an air-tight manner, comprising:

a seal portion formed on at least one joint surface of said two members, said seal portion comprising continuously printed sealing materials along said at least one joint surface; and wherein said seal portion has a middle portion and side portions in a width direction thereof, and said middle portions is formed to have a thickness thinner than that of said side portions so that a recess or a groove is formed on a sealing surface of a meeting portion in which at least a plurality of said seal portions are crossed to each other.

2. The seal structure as recited in claim 1, wherein said recess or said groove is formed in such a manner that a height of said seal portion is not locally changed in a direction of the length.

3. The seal structure as recited in claim 1 or claim 2, wherein said recess or said groove is formed at a portion in which a height of said seal portion is required to be locally reduced.

4. The seal structure as recited in claim 1 or claim 2, wherein said recess or said groove is formed at a portion near a fastening portion by a bolt.

5. The seal structure as recited in claim 1 or claim 2, wherein said recess or said groove is formed at a portion in which an improved sealing performance is required.

6. The seal structure as recited in claim 1 or claim 2, wherein a width of said recess or said groove is gradually changed.

7. The seal structure as recited in claim 1 or claim 2, wherein said seal portion is made of a hard material and a hardness of the hard material is set to be 10 to 50 in a hardness of type D durometer which is defined by JIS K 6253.

8. The seal structure as recited in claim 1 or claim 2, wherein said seal portion is formed by successively printing a plurality of materials having a different composition.

9. The seal structure as recited in claim 1 or claim 2, wherein said seal portion is formed on one of the joint surfaces of the two members, and wherein a seal groove is formed on the other of joint surfaces of the two members so as to correspond to said seal portion.

10. The seal structure as recited in claim 1 or claim 2, wherein one of the two members is a separate plate of a control valve unit for an automotive vehicle and the other of the two members is a valve body separated in an oil-tight manner by said separate plate.

* * * * *